United States Patent [19]

Nguyen

[11] Patent Number: 4,825,493
[45] Date of Patent: May 2, 1989

[54] DOCK-LEVELER LOCK

[75] Inventor: Hoa Nguyen, London Ontario, Canada

[73] Assignee: TI Serco Corporation, Ontario, Canada

[21] Appl. No.: 84,362

[22] Filed: Aug. 12, 1987

[51] Int. Cl.⁴ .......................... E01D 1/00; B65G 11/00
[52] U.S. Cl. .................................................... 14/71.3
[58] Field of Search ...................... 14/71.1, 71.3, 71.5, 14/71.7, 69.5; 193/5, 38, 41; 414/537; 292/216, 228, 262, 272, 338; 16/85, 291, 292, 296

[56] References Cited

U.S. PATENT DOCUMENTS

| | | | |
|---|---|---|---|
| 2,039,960 | 5/1936 | Jacobs | 16/85 X |
| 2,767,422 | 10/1956 | Ulrich | 16/85 |
| 2,769,197 | 11/1956 | Travis et al. | 16/85 |
| 2,849,748 | 9/1958 | Angstadt | 16/85 |
| 2,857,617 | 10/1958 | Loria | 16/85 |
| 2,860,369 | 11/1958 | Galla | 16/85 |
| 2,980,945 | 4/1961 | Hollar, Jr. | 16/85 |
| 3,137,876 | 6/1964 | Loomis | 14/71.3 |
| 3,411,168 | 11/1968 | Hecker, Jr. | 14/71.3 |
| 3,460,175 | 8/1969 | Beckwith et al. | 14/71.3 |
| 3,497,893 | 3/1970 | Beckwith et al. | 14/71.3 |
| 3,833,964 | 9/1974 | Harcourt | 16/291 |
| 3,835,497 | 9/1974 | Smith | 14/71.3 |
| 3,837,040 | 9/1974 | Keller et al. | 16/85 X |
| 3,882,563 | 5/1975 | Smith et al. | 14/71.3 |
| 3,883,917 | 5/1975 | Alten | 14/71.3 |
| 3,974,537 | 8/1976 | Ellis et al. | 14/71.3 |
| 4,663,801 | 5/1987 | Malopolski, Jr. | 16/85 X |

Primary Examiner—Stephen J. Novosad
Assistant Examiner—John F. Letchford
Attorney, Agent, or Firm—Sughrue, Mion, Zinn, Macpeak & Seas

[57] ABSTRACT

A manual lock for a vertically storing lock leveler. The leveler has a locking bar on the side thereof which rides on a cam surface of the lock. The lock has a spring biased latch member with the cam surface and a locking recess. When the leveler is in the vertical stored position, the latch overtravels to have the lockbar engaged in the recess so that positive locking occurs. The lock is released by a manual foot or hand release.

12 Claims, 2 Drawing Sheets

DOCK-LEVELER LOCK

BACKGROUND OF THE INVENTION

This invention relates to dock loading equipment and in particular, dock levelers used to bridge the space between a vehicle and a dock surface. Specifically, this invention deals with vertically storing dock levellers and a lock system to secure such devices.

Dock levelers are well known as typified by a number of commercial devices such as the Serco W Series leveler. Such devices are employed at docks to provide a technique for loading and unloading equipment such as fork-lift trucks to move freely from the dock surface to and from the vehicle. Levelers, commonly known as dock boards are hinged for movement to compensate for the variation in height between the vehicle bed and the dock surface. They are conventionally provided with a lip that is actuated in conjunction with the dock board which spans the gap between the dock edge and the rear of the truck.

Dock levelers may store either vertically or horizontally. Horizontally stored dock levelers are generally mounted in pits cut into the dock. The leveler, when stored, is positioned with its surface flush with the dock to establish a so called "crosstraffic" position that allows movement transverse to the dock. In this storage position, the lip usually hangs pendent closing the pit. Such horizontally storing levelers, while in common usage, have a number of disadvantages. In operation, a truck must stop and have the rear doors opened prior to finally parking against the dock. This is necessary since typical dock heights and door openings block the trailer doors from opening when the truck has fully backed into position. When the truck resumes backing in, cargo may spill out, damaging freight.

Additionally, the dock area is a collection point for debris accumulating in the pit underneath the dock leveler. Frequent cleaning is required and in extreme cases, the operation of the leveler may be impaired. Security is also a problem with conventional horizontally storing levelers. Intruders and rodents enter the dock area by going under the door through the dock leveler.

These disadvantages have lead to the consideration of vertically storing dock levelers. Such devices perform the same function, providing an access bridge between the dock and the vehicle, but are positioned inside the dock area on the dock surface. Such devices are not mounted in any pit. They are stored vertically at a point inside the dock to allow dock doors to close and completely seal the dock. A vertically storing dock leveler may be either hydraulically or electrically actuated by a control panel located near the dock board. The dock board is lowered into position by such an actuator with the lip actuated either manually or hydraulically. When stored in the vertical position, customarily a solenoid is used in the power actuation circuit so that when the power to the leveler is turned off, the leveler is locked in its present position.

Given the need for increased safety in the dock environment, additional means are needed to insure that a vertically storing dock leveler will not be accidentally lowered by a worker. For example, given the noise level at a dock, one person could mistakenly lower a leveler or lower the wrong leveler in a situation where multiple devices are operated from a common control panel. There is also the problem of damage to the actuation system that could allow the lift system to release the leveler from its locked position. Thus, a need exists for a lock system independent of the actuation mechanism to provide adequate security and safety for a vertically storing leveler.

SUMMARY OF THE INVENTION

Given the safety requirements of such devices, it is an object of this invention to provide a simple lock mechanism for a vertically storing dock leveler.

It is another object of this invention to provide a simple mechanical lock that automatically engages the leveler when the leveler is moved into the vertically storing position and independently prevents the leveler from lowering unless released.

A further object of this invention is to provide a lock mechanism for a vertically storing dock leveler that is safe, reliable and operated independent of the leveler system.

These and other objects of this invention are accomplished by a manual, hand or foot operated, mechanical lock having a spring loaded cam latch that automatically engages a lockbar on the leveler. When the latch is displaced to release the lockbar, the lockbar rides on a cam surface as the leveler is lowered. The spring bias allows the latch to pivot and follow the lockbar and maintain physical contact. When the leveler is raised, the lockbar rides on the cam surface as the latch pivots into a vertical position. When the leveler is vertical, the latch member has pivoted into an overtravel position such that the lockbar is engaged by a detent in cam the surface and the latch locks the leveler vertically preventing downward movement.

These and other aspects of this invention will be explained in greater details by referring to the attached drawing and the description of the preferred embodiment that follows.

DETAILED DESCRIPTION OF THE INVENTION

Figure 1:
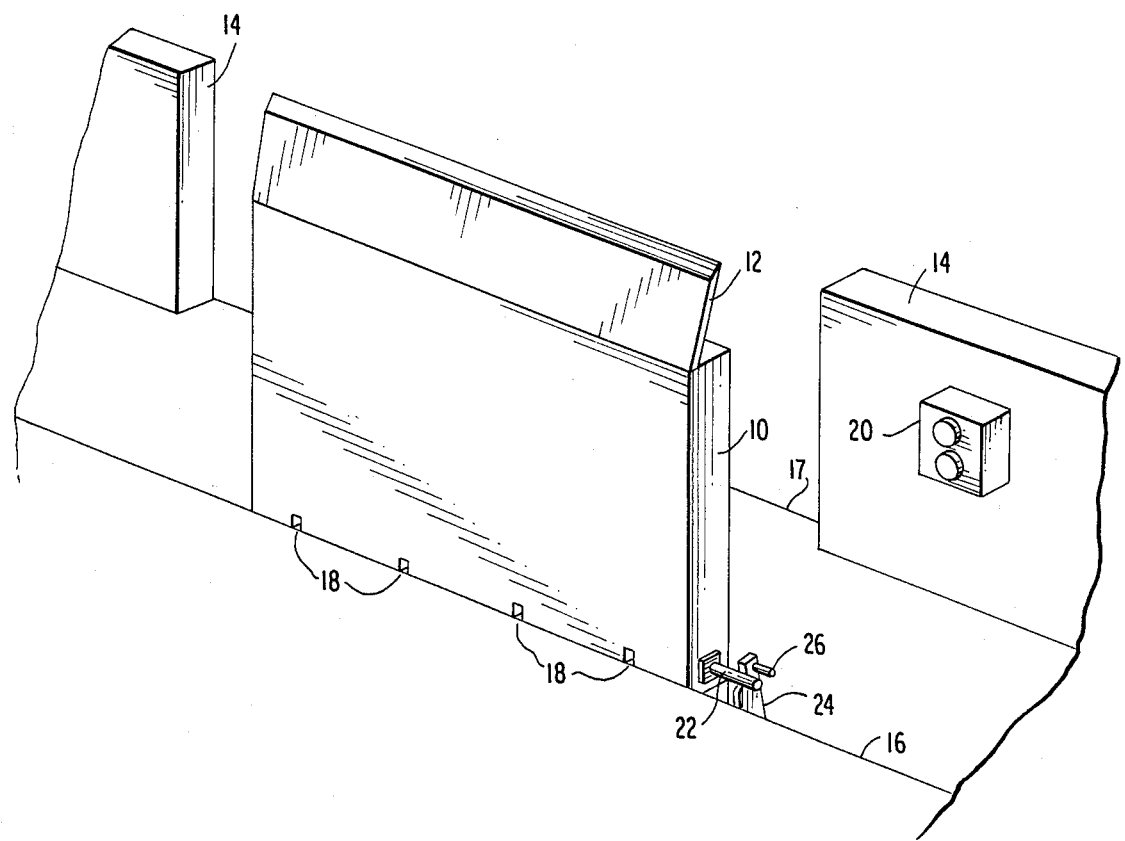
FIG. 1 is a perspective view of a vertically storing dock leveler illustrating the major components of this invention.

Referring now to FIG. 1, the basic elements of this invention are depicted. The dock leveler, illustrated in the vertically stored position, has a hinged lip. The leveler is mounted inside a dock area having an exterior wall with a loading opening. A door (not illustrated) is used to seal the opening. The leveler is positioned at the edge of a low shelf 16 to provide a flush surface and is hinged by members 18. The actuator for the leveler is not illustrated since the cylinders, in the case of hydraulic actuation are placed on the underside of the leveler 10. Similarly, the actuator for the lip 12, whether hydraulic or mechanical, is positioned on the underside of the leveler. The leveler is operated by means of the control panel 20, typically mounted on wall 14.

Figure 2:
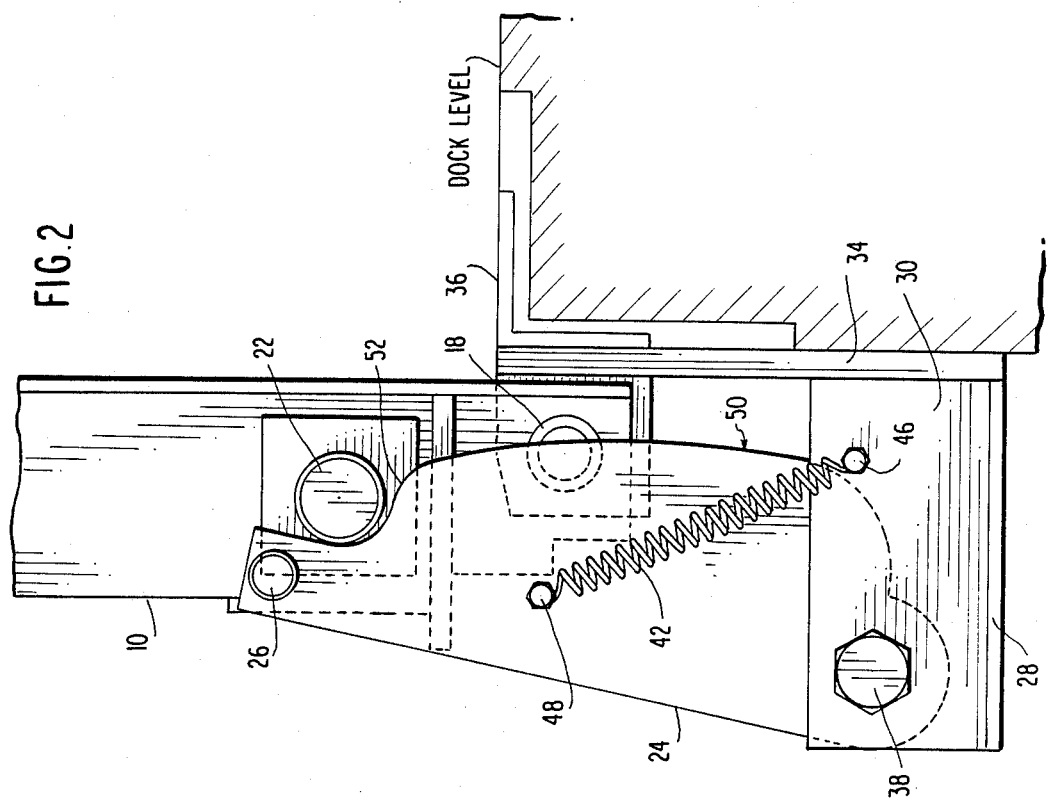
FIG. 2 is an end view of the lock and a portion of the leveler in a vertically stored position.
Figure 3:
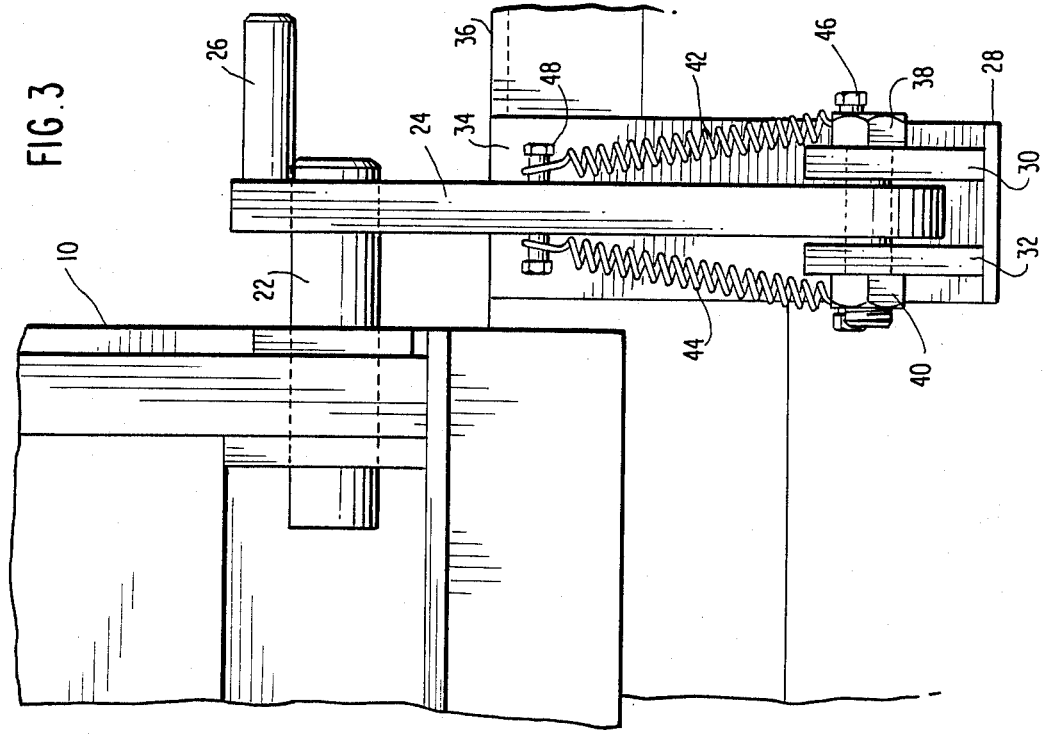
FIG. 3 is a front view of the lock and a portion of the vertically stored dock leveler.

In accordance with this invention, the leveler 10 has a lockbar 22 mounted to extend from one side thereof. As will be explained in detail, lockbar 22 engages the lock latch mechanism 24. Referring now to FIGS. 2 and 3, the mechanism is illustrated in greater detail. A latch housing 28 is mounted in the shelf 16 which is approximately one foot deep and running about four to five feet in width from the dock edge 17. The housing 28 comprising a pair of parallel frame members 30, 32 attached, for example by welding, to a back plate 34. The back plate in turn is fixed to a flange member 36 that anchors the housing 28 to the dock at the shelf 16.

The latch 24 is rotatably mounted in housing 28 by hinge bolt 38, suitably retained by a nut 40. The latch is spring biased into engagement with the lockbar 22 by means of a pair of springs 42, 44. The springs are tensioned between a pair of bolts 46, 48 which are respectively mounted through the frames 30, 32 and the latch 24. The springs are angled to the vertical and displaced from the pivot axis (hinge bolt 38) so that the latch tends to rotate clockwise as illustrated in FIG. 3.

The latch 24 has a cam surface 50 which bears against the lockbar 22. The cam surface includes a recess 52. As illustrated in FIG. 3, when the leveler 10 is in the stored vertical position, lockbar 22 is positioned in the recess 52 of the latch 24. The lockbar is offset horizontally and vertically relative to the pivot axis of the latch. Thus, if the leveler is actuated to be lowered, counterclockwise movement in FIG. 2 around hinge member 18, the lockbar will seat in the recess 52 and generate a compressive force on the latch 24. Given the gauge of the latch member 24, the latch will remain in the position illustrated in FIG. 3 locking the leveler.

When the leveler is to be lowered, a switch on the control panel is actuated to energize either the system hydraulics or electrical system. The operator then uses his foot on the release bar 26 to push out the latch 24 so that the lockbar 22 will clear the locking surface recess 52. As the leveler then lowers, the lockbar 22 will ride down on the latch cam surface 50. While pivoting down around bolt 38, springs 42, 44 maintain the latch 24 in engagement with the lockbar. When the leveler reaches the vertical stored position, the overtravel by the latch results in the lock bar engaging the locking recess 52. With the hydraulic or electrical system locked at panel 20 and the latch 24 locked, the leveler is both mechanically and hydraulically locked.

It is apparent that modifications of this invention may be practiced without departing from the scope thereof. For example, while foot release is illustrated, the latch 24 could be released by hand operation. A swinging bar mounted on the side of the leveler could engage the latch above the lock bar 22. When pushed, the bar would move the latch out of its locked position.

What is claimed is:

1. A locking mechanism for a dock leveler comprising:
    a dock leveler mounted on a dock surface for hinged movement between an operative position and a stored inoperative position, a locking engagement member protruding outward from one side of said leveler;
    a latch member mounted on said dock surface adjacent said leveler, said latch member rotatable and having a surface upon which said locking engagement member contacts as said leveler is moved from an operative to an inoperative position, said latch member further comprising means engaging said locking engagement member when said leveler is in said inoperative position to restrain hinged movement toward said operative position, and
    said means engaging said locking engagement member comprises a recess in said surface.
2. The locking mechanism of claim 1, wherein said surface is a cam to rotate said latch member in correspondence with motion of said dock leveler.
3. The locking mechanism of claim 1, wherein said recess is positioned on said surface not in alignment with a line connecting the axes of rotation of said leveler and said latch member.
4. The locking mechanism of claim 1, further comprising means to bias said latch member into contact at said surface with said locking engagement member.
5. The locking mechanism of claim 1, further comprising means to manually move said latch member out of contact with said locking engagement member.
6. The locking member of claim 1, further comprising means to actuate said dock leveler for movement between said operative and said inoperative positions.
7. A dock leveler comprising:
    a dock leveler member mounted on a dock surface for rotation between a substantially vertically stored inoperative position and a substantially horizontal operative position, a locking engagement member protruding outward from one side of said dock leveler member;
    a latch member mounted to rotate about an axis horizontally and vertically offset from said docking engagement member and in correspondence with said dock leveler and comprising a surface having a recess in contact with said locking engagement member when said leveler is in said substantially vertical inoperative position to restrain movement of said dock leveler into said operative position.
8. The locking mechanism of claim 8, wherein said surface is a cam to rotate said latch member in correspondence with motion of said dock leveler.
9. The locking mechanism of claim 7, wherein said recess is positioned on said surface not in alignment with a line connecting the axes of rotation of said leveler and said latch member.
10. The locking mechanism of claim 7, further comprising means to bias said latch member into contact at said surface with said locking engagement member.
11. The locking mechanism of claim 7, further comprising means to manually move said latch member out of contact with said locking engagement member.
12. The locking member of claim 7, further comprising means to actuate said dock leveler for movement between said operative and said inoperative positions.

* * * * *